United States Patent
Goethe

(10) Patent No.: US 10,000,119 B2
(45) Date of Patent: Jun. 19, 2018

(54) CONSTANT VELOCITY DRIVE ASSEMBLY

(71) Applicant: Bret Goethe, Littleton, CO (US)

(72) Inventor: Bret Goethe, Littleton, CO (US)

(*) Notice: Subject to any disclaimer, the term of this patent is extended or adjusted under 35 U.S.C. 154(b) by 0 days. days.

(21) Appl. No.: 14/510,048

(22) Filed: Oct. 8, 2014

(65) Prior Publication Data

US 2015/0096825 A1    Apr. 9, 2015

Related U.S. Application Data

(60) Provisional application No. 61/888,381, filed on Oct. 8, 2013.

(51) Int. Cl.

| | |
|---|---|
| B60K 17/30 | (2006.01) |
| B60K 17/24 | (2006.01) |
| F16D 3/06 | (2006.01) |
| F16D 3/223 | (2011.01) |
| F16D 3/84 | (2006.01) |
| B60K 17/22 | (2006.01) |

(52) U.S. Cl.
CPC ............ B60K 17/24 (2013.01); B60K 17/22 (2013.01); F16D 3/06 (2013.01); F16D 3/223 (2013.01); F16D 3/845 (2013.01); *F16D 2003/22313* (2013.01); *F16D 2003/22316* (2013.01); *Y10S 464/906* (2013.01)

(58) Field of Classification Search
CPC ......... B60K 17/22; B60K 17/24; F16D 3/223; F16D 3/845; F16D 3/06; F16D 2003/22313; F16D 2005/22316; Y10S 464/906
USPC ................ 464/178, 906; 180/384, 385, 256; 384/544, 589
See application file for complete search history.

(56) References Cited

U.S. PATENT DOCUMENTS

| | | | | |
|---|---|---|---|---|
| 4,610,327 A | * | 9/1986 | Orain ..................... | B60K 17/22 |
| 4,909,774 A | * | 3/1990 | Muller .................... | B60K 17/22 |
| | | | | 464/906 |
| 5,052,979 A | * | 10/1991 | Welschof ............ | B60B 27/0005 |
| | | | | 464/178 X |
| 6,241,617 B1 | * | 6/2001 | Jacob ..................... | B60K 17/22 |
| | | | | 464/906 |
| 6,273,825 B1 | * | 8/2001 | Schwarzler ............ | F16D 3/227 |
| | | | | 464/906 |

* cited by examiner

*Primary Examiner* — Gregory J Binda
(74) *Attorney, Agent, or Firm* — Dorsey & Whitney LLP

(57) ABSTRACT

A constant velocity driveline assembly comprises a tail housing assembly with a housing, at least two bearings inside the housing, and a first drive hub supported by the at least two bearings. The first drive hub may be substantially fixed longitudinally and configured to connect to an engine or transmission of the automobile. The assembly comprises a second drive hub configured to connect to a rear differential of the automobile. Each drive hubs may include a barrel portion and a mounting flange connected to an end of the barrel portion. The assembly includes a first constant velocity driveshaft joint configured to attach to the mounting flange of the first drive hub. The assembly includes a drive shaft having a first splined axial end coupled to the internal spline of the first constant velocity driveshaft joint. The assembly may include a second constant velocity driveshaft joint comprising internal splines to couple to a second splined axial end of the drive shaft to transmit torque, the second drive hub coupled to an external housing of the second constant velocity driveshaft joint.

14 Claims, 12 Drawing Sheets

CONSTANT VELOCITY DRIVE ASSEMBLY

CROSS-REFERENCES TO RELATED PATENT APPLICATIONS

The present application claims the benefit of U.S. Provisional Patent Application No. 61/888,381, entitled "A Constant Velocity Driveshaft assembly for drag racing applications with a suspended rear axle," filed on Oct. 8, 2013, which is incorporated herein by reference in its entirety.

FIELD

The present application is directed to automobile driveline components and more specifically to assemblies including drive shafts with multiple constant velocity joints.

BACKGROUND

Automobiles include a driveline system in place to transfer power/torque from the engine and/or transmission to the rear differential. One type of driveline system is this constant velocity (CV) driveline. Typical CV systems include a tail housing with a bronze bushing or needle bearing to support a slip yoke at the back of the transmission. As the rear suspension moves the yoke moves or slips fore and aft on the transmission output shaft and through the bushing or bearing. Some amount of clearance between the bushing/bearing and the barrel of the slip yoke may be provided in these systems. Clearance may also be provided between the yoke spline and the transmission output shaft spline. This clearance allows for movement of the yoke radially. This radial movement can create an extremely unstable condition for the slip yoke and/or the driveshaft at higher driveline rpms. With suspension movement this clearance can also cause the yoke to bind as it is trying to move on the output shaft splines. U-joints are common connections between the slip yoke and the driveshaft. The driveshaft itself is typically a tubular segment with yokes welded or bonded into each end to accept the u joints. The slip yoke and driveshaft yokes have bores to accept the U-joint cups with a slight interference fit and retaining rings. Alignment of said yokes in the tube known as "phasing" during assembly is critical to avoid vibration and premature failure of U-joints or the driveshaft itself. At the differential, a yoke is attached to the differential pinion shaft. This yoke utilizes u bolts to retain the u joint rather than a bore to facilitate installation and removal of the driveshaft assembly. U bolts are easily over tightened causing deformation of the u joint cup leading to premature failure of the u joint and/or u bolts.

BRIEF SUMMARY

In accordance with various embodiments, a constant velocity driveline assembly that transmits power/torque from a transmission or an engine an automobile to a rear differential of the transmission may be provided. The shaft assembly includes a constant velocity (CV) joint installed on each end of a drive shaft through a splined connection and retained by a snap ring. The CV joints are bolted to the drive hubs.

In accordance with various embodiments an automobile may include a constant velocity driveline assembly for power transmission. The assembly may comprise a drive shaft comprising first and second splined axial ends, a middle portion between the ends, and corresponding shoulders protruding radially from the shaft. The assembly may comprise a first constant velocity driveshaft joint comprising internal splines configured to match to the first splined axial end of the drive shaft to transmit torque forming a plunging drive shaft engagement. The assembly may comprise a second constant velocity driveshaft joint comprising internal splines configured to match to the second splined axial end of the drive shaft to transmit torque forming a plunging drive shaft engagement. The first constant velocity driveshaft joint and the second constant velocity driveshaft joint may be operable to change in length between the joints through the plunging drive shaft engagements. The assembly may comprise a tail housing with fixed position output.

In accordance with various embodiments an automobile may include a constant velocity driveline assembly for power transmission. The assembly may comprise a tail housing assembly with a housing, at least two bearings inside the housing, and a first drive hub supported by the at least two bearings. The first drive hub may be substantially fixed longitudinally and configured to connect to an engine or transmission of the automobile. The assembly may comprise a second drive hub configured to connect to a rear differential of the automobile. Each drive hubs may include a barrel portion and a mounting flange connected to an end of the barrel portion. The assembly may include a first constant velocity driveshaft joint configured to attach to the mounting flange of the first drive hub. The assembly may include a drive shaft having a first splined axial end coupled to the internal spline of the first constant velocity driveshaft joint. The assembly may include a second constant velocity driveshaft joint comprising internal splines to couple to a second splined axial end of the drive shaft to transmit torque, the second drive hub coupled to an external housing of the second constant velocity driveshaft joint.

Additional embodiments and features are set forth in part in the description that follows, and will become apparent to those skilled in the art upon examination of the specification or may be learned by the practice of the disclosed subject matter. A further understanding of the nature and advantages of the present disclosure may be realized by reference to the remaining portions of the specification and the drawings, which forms a part of this disclosure.

BRIEF DESCRIPTION OF THE DRAWINGS

The description will be more fully understood with reference to the following figures and data graphs, which are presented as various embodiments of the disclosure and should not be construed as a complete recitation of the scope of the disclosure, wherein.

DETAILED DESCRIPTION

The present disclosure may be understood by reference to the following detailed description, taken in conjunction with the drawings as described below. It is noted that, for purposes of illustrative clarity, certain elements in various drawings may not be drawn to scale.

In accordance with various embodiments, a constant velocity driveline assembly may transmit torque between an automobile transmission and a differential. The constant velocity driveline assembly may include a constant velocity shaft assembly and a transmission tail housing including a drive hub supported by two or more ball bearings. The constant velocity driveline assembly may include two plunging constant velocity joints on each end of a drive shaft. The drive hub in the tail housing may be connected to one of the constant velocity joints. And the drive hub for the differential may be connected to another constant velocity joint.

The constant velocity driveline assembly may achieve movement through the ball bearings. Unlike U-joints that require equal operating angles to perform with minimal vibration, the constant velocity joints are not sensitive to angles and allow the angle of the differential pinion to be changed without sacrificing transmission performance and efficiency.

The constant velocity driveline assembly includes a bolted connection between the constant velocity joint and the flange of the drive hub, which eliminates problematic U-joint cups and U-bolts.

The constant velocity (CV) driveline assembly may also eliminate the radial instability and potential binding of a slip yoke while also reducing or eliminating thrust loads on a transmission output shaft. This may in turn reduce or eliminate thrust loads on other internal transmission components. By using the constant velocity driveline assembly, a rear suspension may move more easily and freely. The drive shaft movement with a slip yoke may cause the yoke to be moved fore and aft on the transmission output by sliding the spline of the slip yoke on the output shaft spline, this may become very difficult when power/torque is applied to the splines to cause the suspension to work harder in order to move the yoke. Applying a CV driveline and/or a duel CV driveline may alleviate this issue.

Figure 1:
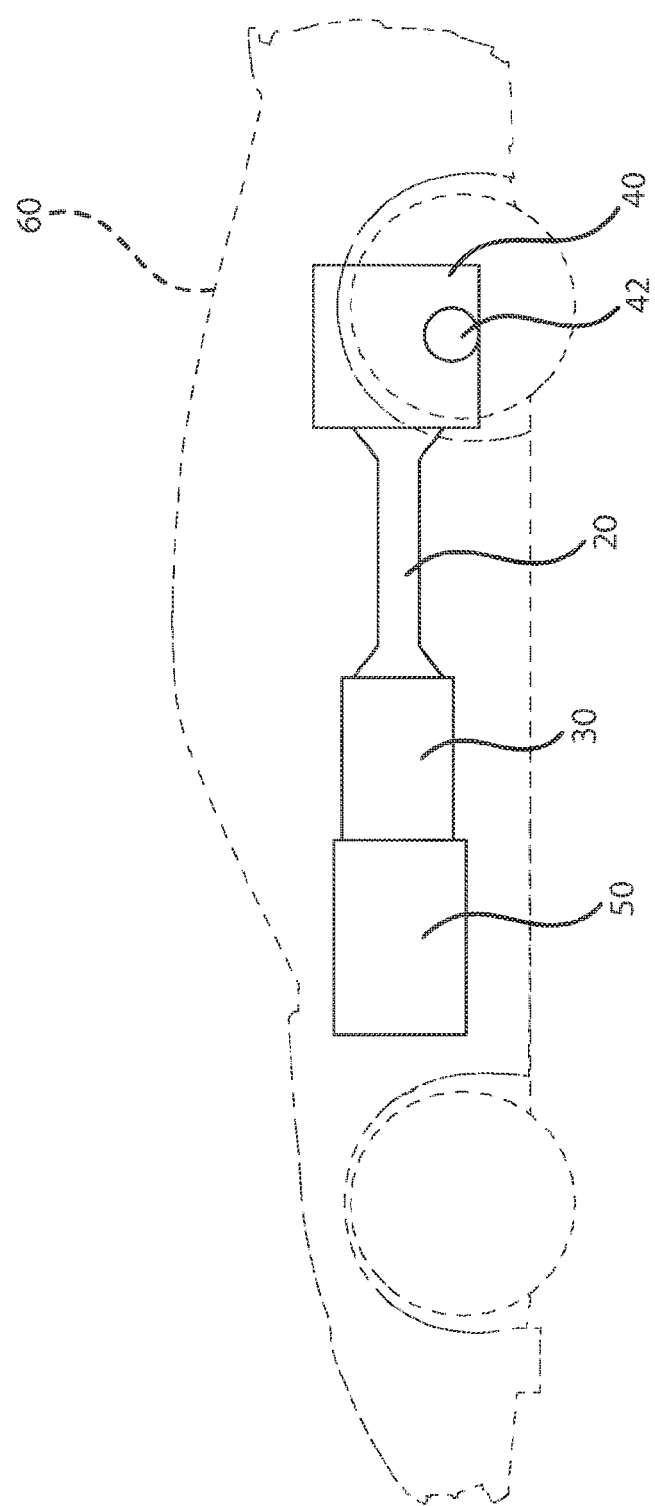
FIG. 1 is a schematic block diagram for an automobile drivetrain including engine, transmission, rear differential and a dual constant velocity drive shaft assembly connecting the transmission to the rear differential.

In accordance with various embodiments, as illustrated in FIG. 1, which is a block diagram for a system, an automobile 60 may include an engine 50, a transmission 30, and a differential 40. The transmission 30 may direct power to the differential 40 powering the axles 42 which in turn powers one or more of the rear wheels of the vehicle. A constant velocity driveline assembly 20 as shown in FIGS. 2 and 2A-2C may transmit torque between the transmission 30 and the differential 40. The drive line assembly 20 may include a drive shaft 9 that connects a first CV joint 13a to a second CV joint 13b. The first CV joint 13a may be a transmission side CV joint which mounts to an output from the transmission. The transmission 30 output may include a tail housing assembly 100.

Figure 2:
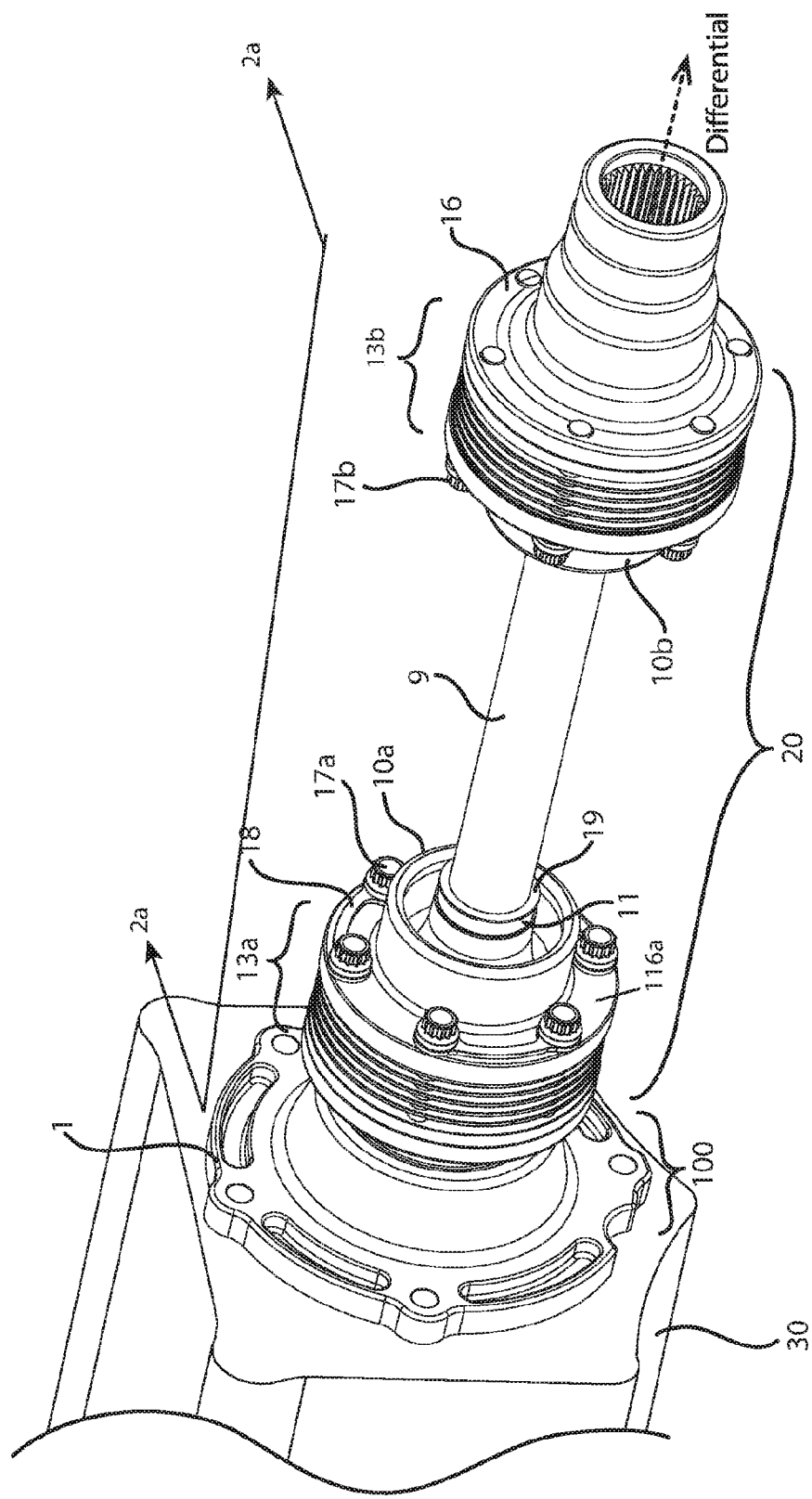
FIG. 2 is a front perspective view of a transmission tail housing and CV drive shaft assembly and FIG. 2A is a cross section view of FIG. 2 taken along cross section line 2A and FIG. 2B is a detailed view of FIG. 2A taken along details line 2B-2B and FIG. 2C is a detailed view of FIG. 2A taken along detail line 2C-2C.
Figure 2A:
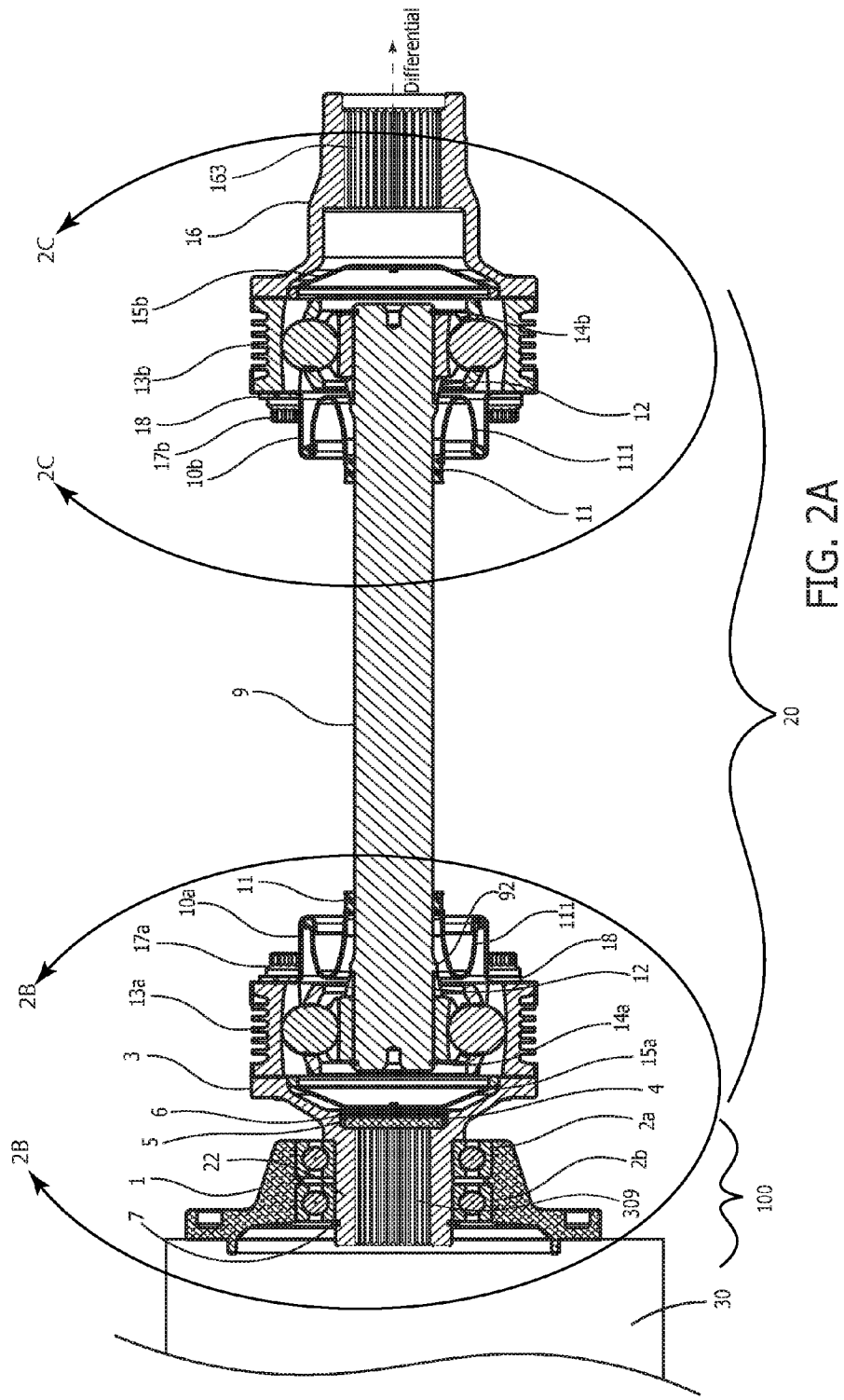
Figure 2B:
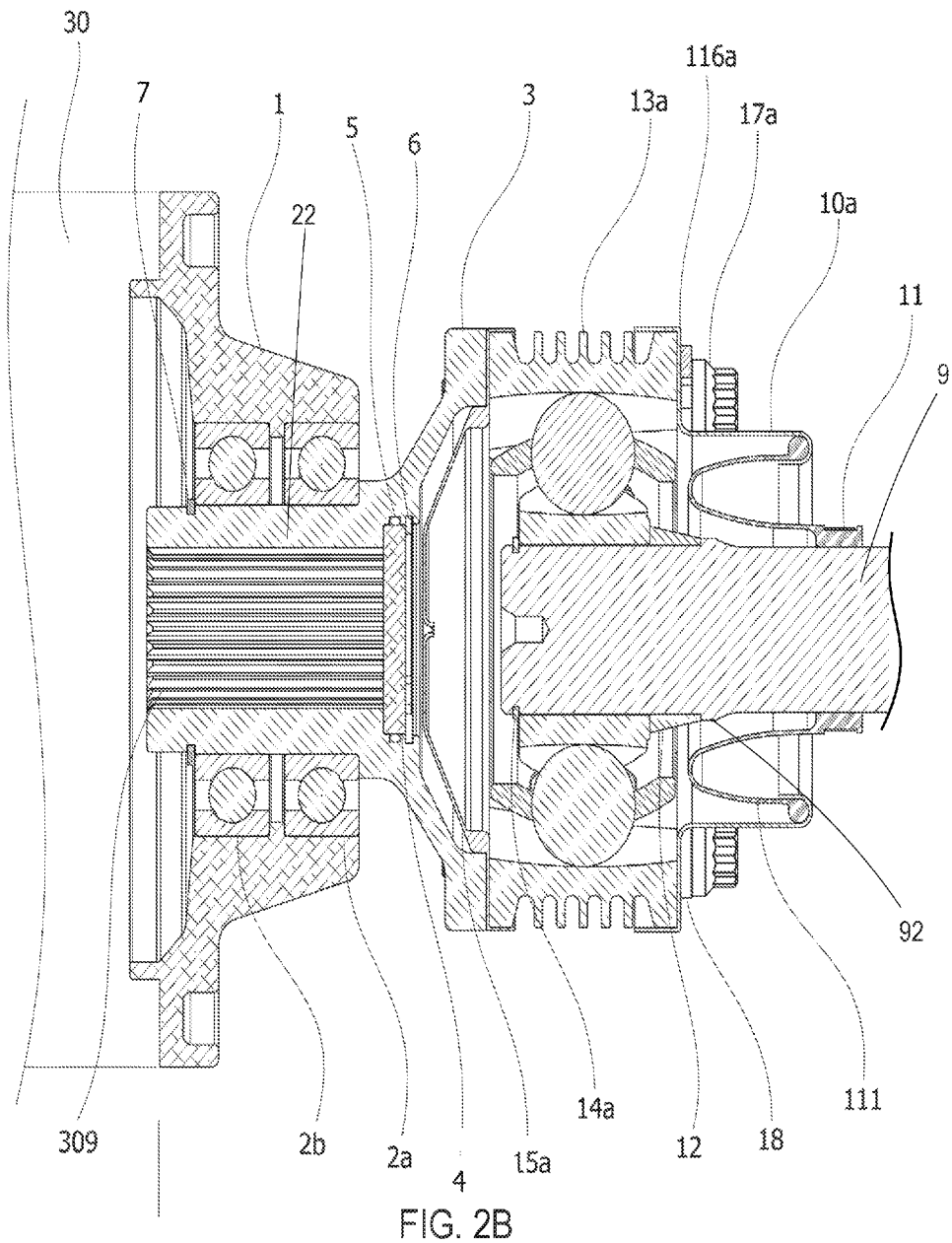
Figure 2C:
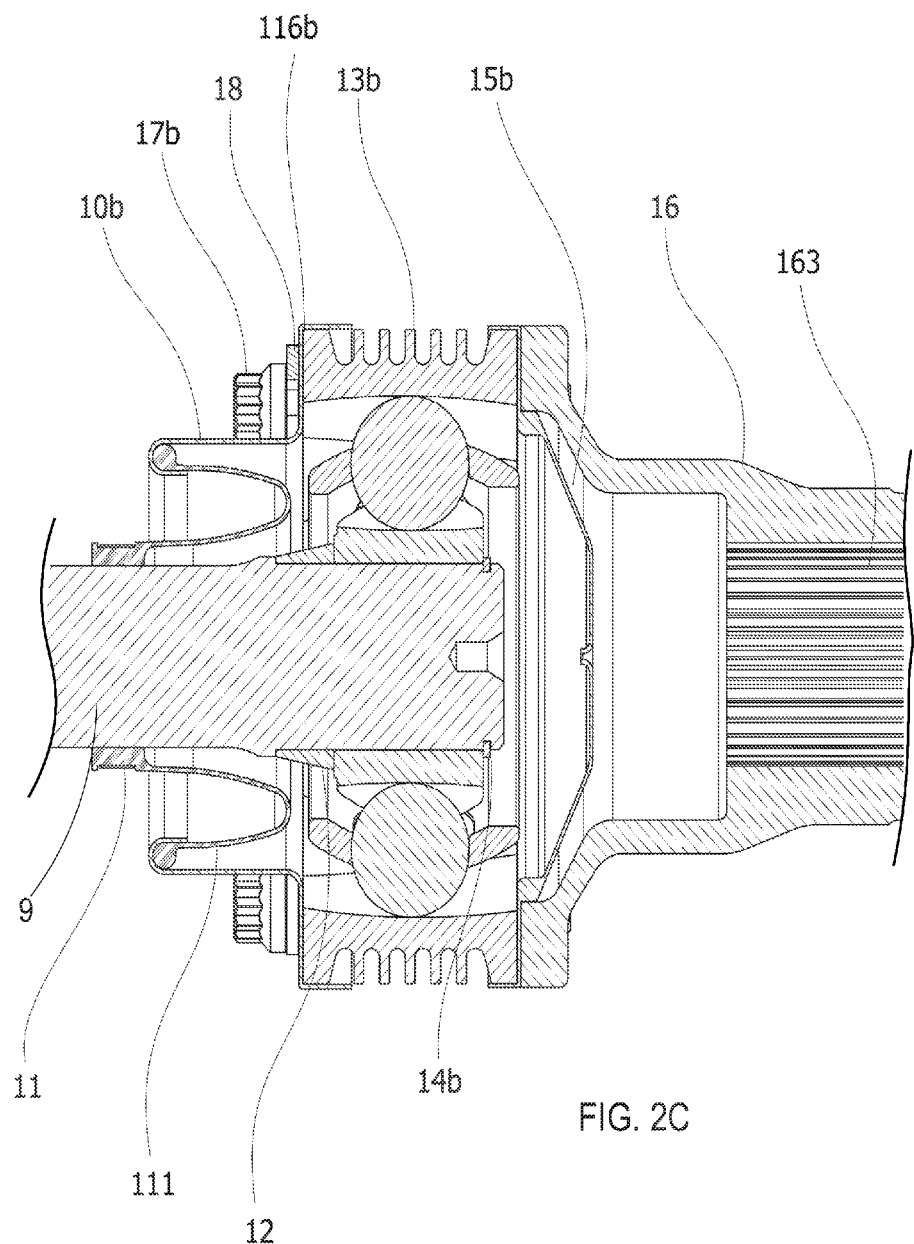
Figure 3:
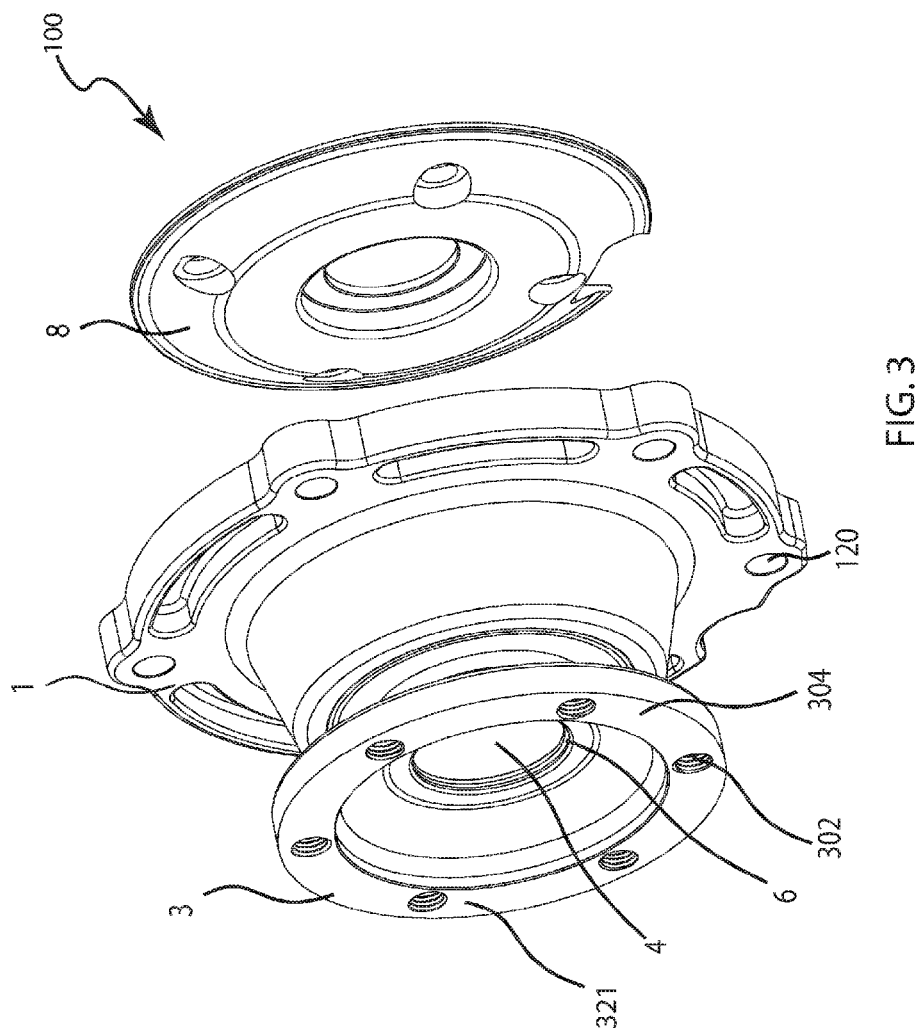
FIG. 3 is a back perspective view of the transmission tail housing assembly of FIG. 2.
Figure 4:
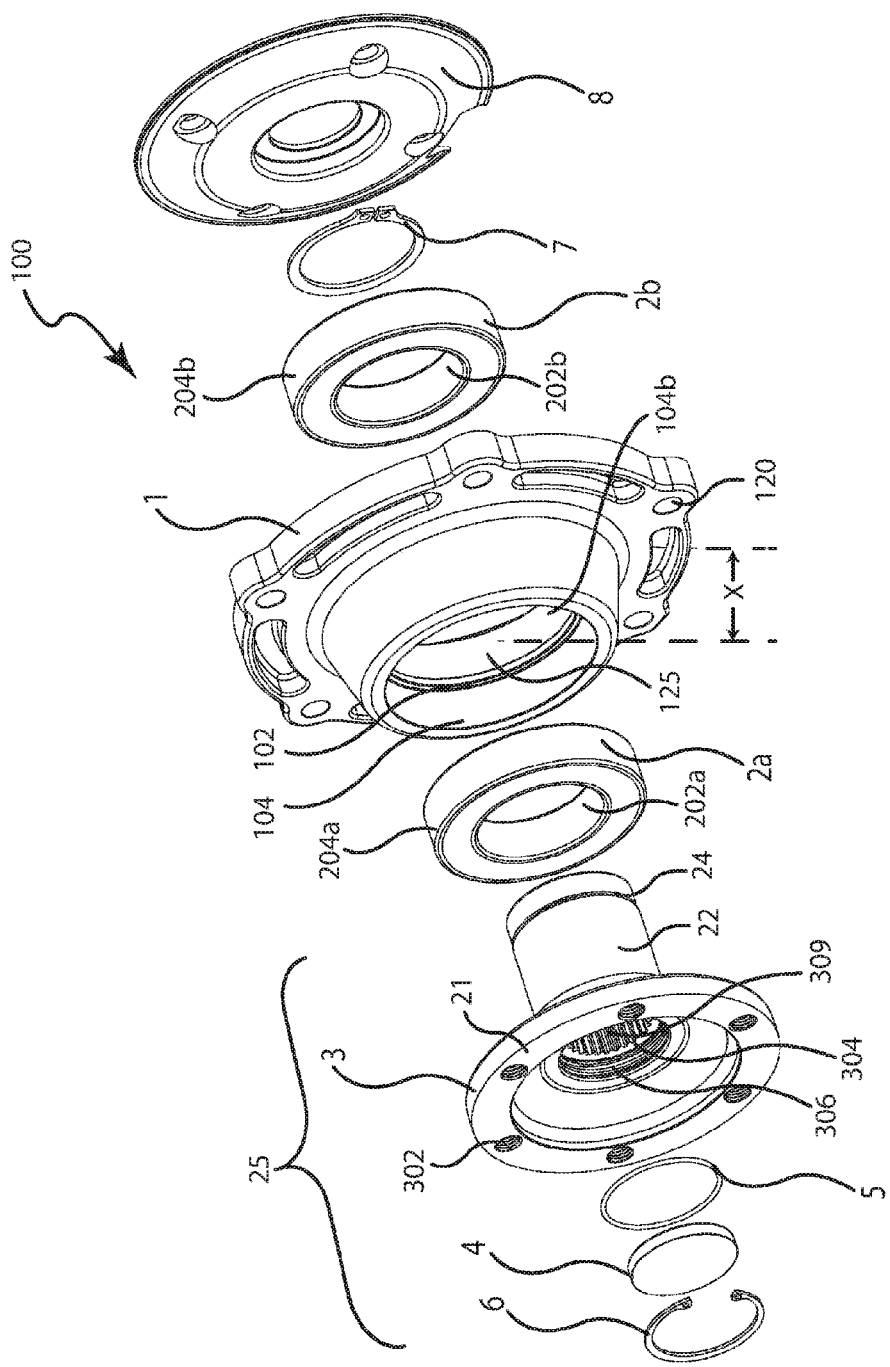
FIG. 4 is a back perspective exploded view of a drive hub and the transmission tail housing assembly of FIG. 2.
Figure 5:
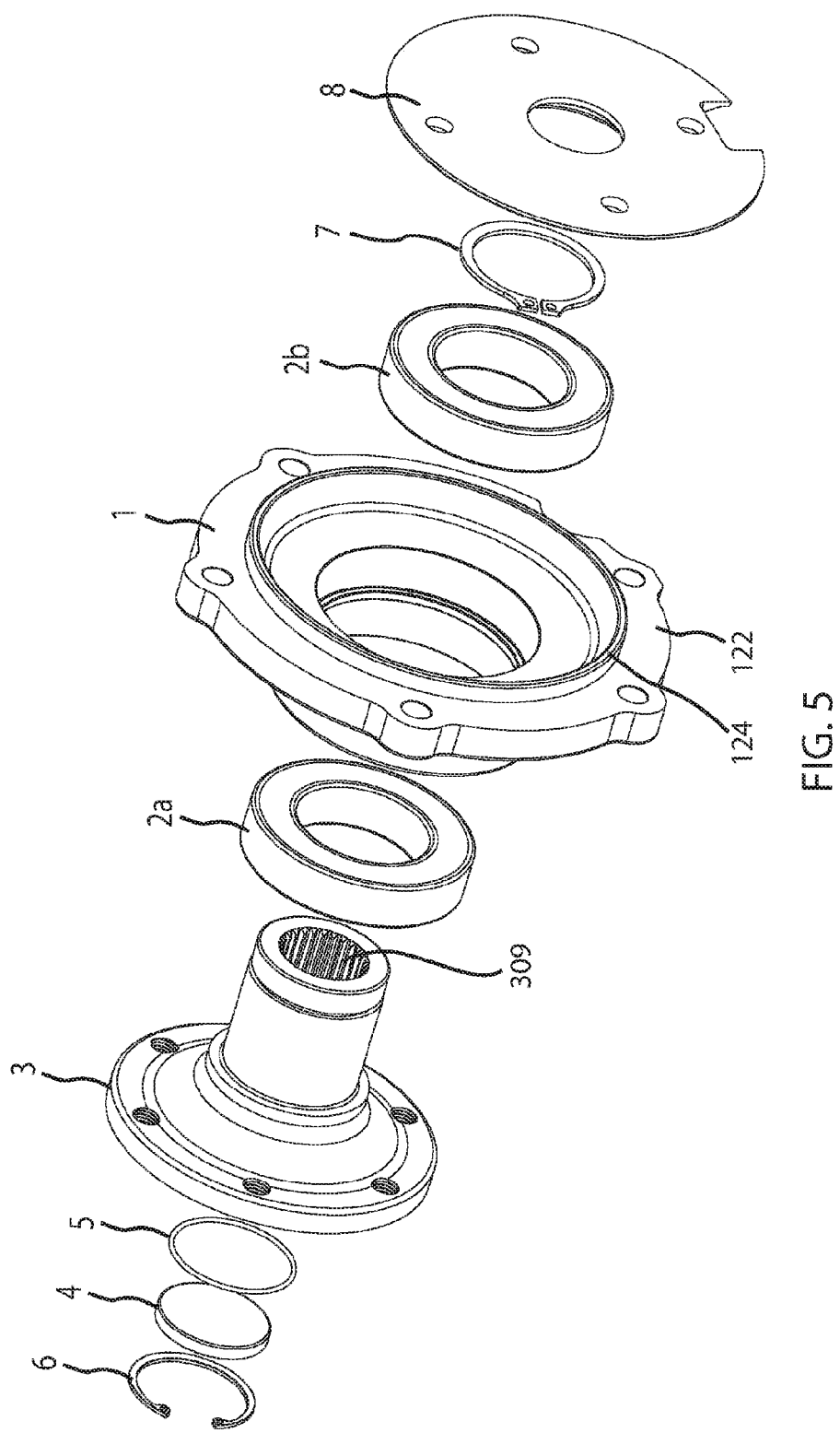
FIG. 5 is a front perspective exploded view of a drive hub and the transmission tail housing assembly of FIG. 2.

FIGS. 3-7 illustrate various portions of the driveline assembly shown in FIGS. 2 and 2A-2C. In accordance with various embodiments, as illustrated in FIGS. 3-5, the tail housing assembly 100 may include a tail housing 1, and a front drive hub 3. FIG. 3 is a back perspective view of the transmission tail housing assembly and FIGS. 4 and 5 are exploded front and back perspective views of a transmission tail housing assembly in accordance with embodiments of the present disclosure. The tail housing 1 may be any housing operable to support the front drive hub 3 from the transmission 30. The tail housing 1 may be manufactured from any known materials such as e.g. machined from billet or cast aluminum or steel or other materials. The front drive hub 3 may be driven by the output shaft of the transmission 30. For example, the front drive hub 3 may include an internally splined center portion 309 which engages an external splined shaft forming part of transmission 30. The internal splines 309 may be operable to transmit torque or power from the transmission 30. The front drive hub 3 may also include a flanged portion 321 having a plurality of engagement features 302 such as threaded apertures that are operable to engage a CV joint. For example, the drive hub 3 may have the mounting flange 321 with six bolt holes 302 as shown in FIGS. 3-5. The bolt holes may be evenly distributed along the outer circumference of the mounting flange 321. The drive hub 3 may be fastened to the first CV joint 13a by mating the surface of the mounting flange 321 to the first CV joint 13a and assembling the two systems with bolts through the engagement features 302.

In accordance with various embodiments, the drive hub 3 may be a part of a drive hub subassembly 25. The drive hub subassembly 25 may include the drive hub 3, an O-ring 5, and sealing plug, 4. The O-ring 5 may engage a surface 304 located on the end of the splines proximal to the flange 321 at an end of the splines of the drive hub. The plug may compress the O-ring from the outside and be retained within the interior of the drive hub 3 by an internal snap ring 6. The internal snap ring 6 may engage in a groove 306 which is located between surface 304 and the flange 321. The snap ring 6 may retain the O-ring 5 and plug 4, which may prevent fluid loss.

In accordance with various embodiments, a barrel 22 of the drive hub 3 may pass through a center opening 125 of the tail housing 1. The barrel 22 may define a bearing surface operable to support a bearing which may be positioned between the housing 1 and the drive hub 3. This bearing may be a bronze bearing, needle bearing, a ball bearing, or any other bearing known in the art. In one embodiment, a first bearing 2a and second bearing 2b may support the barrel 22 on internal surfaces 202a and 202b. As shown in FIGS. 2A, 2B and 4, the tail housing 1 may include internal circumferential surfaces 104a and 104b which may support the exterior surface 204a and 204b of the respective bearings. The bearings may be installed into the housing 1 by any means known. In one example an interference fit between the exterior surface 204a and 204b may engage the internal circumferential surfaces 104a and 104b. In this manner, the drive hub 3 may be supported by at least two or more ball bearings (e.g. 2a, 2b) placed inside a transmission tail housing 1, which is bolted to the rear of the transmission. An internal ridge 102 within the center aperture of the tail housing 1 separates or spaces bearing 2a and 2b apart from one another. The barrel 22 may also include a groove 24 which is circumferential about the barrel 22. The groove may engage exterior retaining ring 7 which is operable to secure the drive hub 3 within the tail housing 1. In this configuration the drive hub 3 may form a fixed position transmission output. The transmission tail housing assembly 100 may also include a plate 8 for blocking off the transmission oil flow from a pump. The plate may be installed to the back of the transmission prior to tail housing installation. The tail housing 1 may include a mating surface 122 operable to mate with the transmission 30. A plurality of engagement features 120 may be spaced around the exterior of the tail housing 1 such that the tail housing 1 can be securely attached to the transmission 30 via the engagement features 120. In one example, the engagement features 120 may be apertures operable for receiving fasteners, for fastening the housing 1 to the transmission 30. A positioning feature 124 may be located on the side of the housing proximal the mating surface 122. The feature 124 may engage a corresponding aperture on the transmission 30 such that the housing 1 is located accurately relative to the transmission 1.

In various embodiments, with the ball bearings 2a and 2b installed inside the housing 1, the drive hub subassembly 25 may be installed into the ball bearings 2 via an interference fit and may be retained by using an external snap ring 7 to snap fit into the housing 1.

Figure 7:
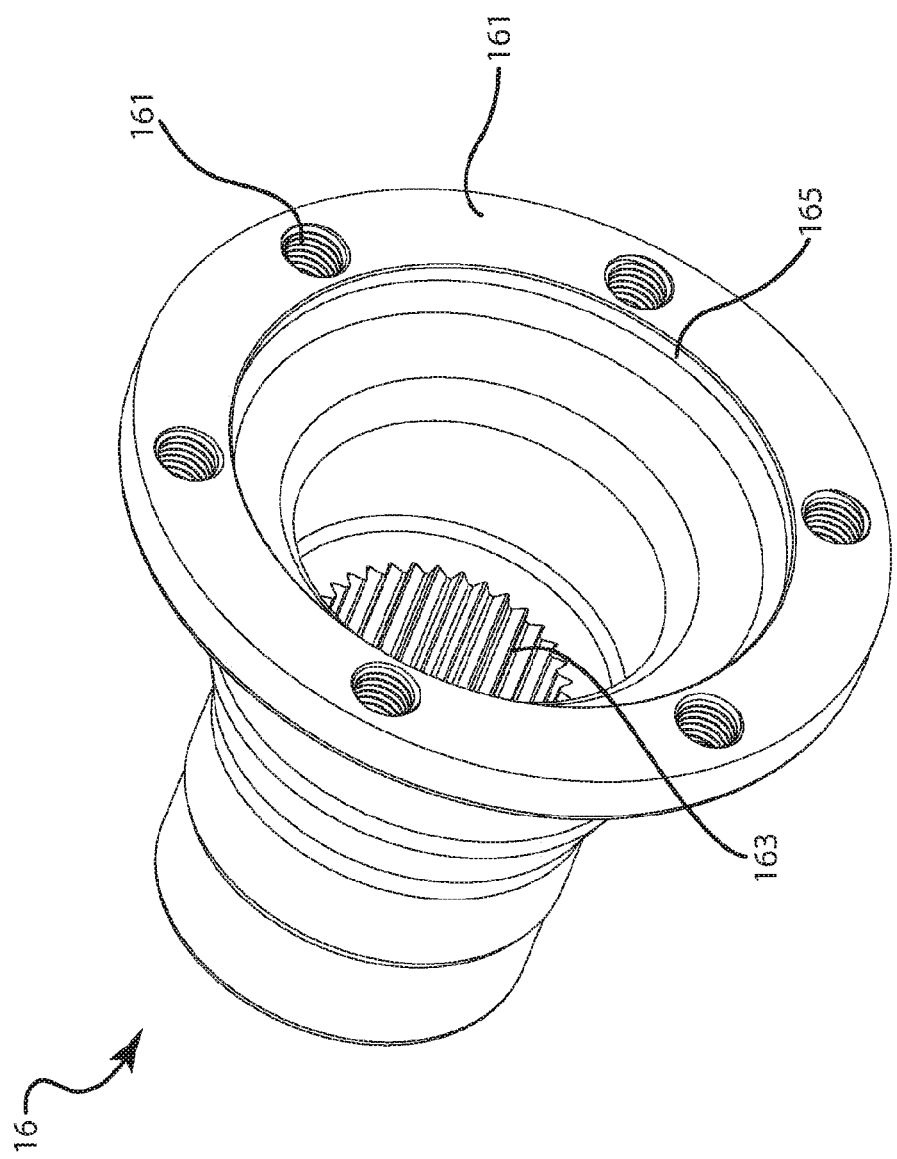
FIG. 7 illustrates a perspective view of the differential drive hub of FIG. 2.

In accordance with various embodiments, as shown in FIG. 7, a similar drive hub may be positioned on the output shaft of the differential and engage the opposing end of the drive shaft assembly. For example, as shown in FIGS. 2 and 7-9, a rear drive hub 16 may include internal splines 163 operable to be attached to the pinion shaft through a splined connection. The drive hub 16 may have a flanged surface 162 which mates with CV joint 13b. The drive hub 16 may also have engagement features 161 operable to securely attach the drive hub 16 to the CV joint 13b.

Figure 6:
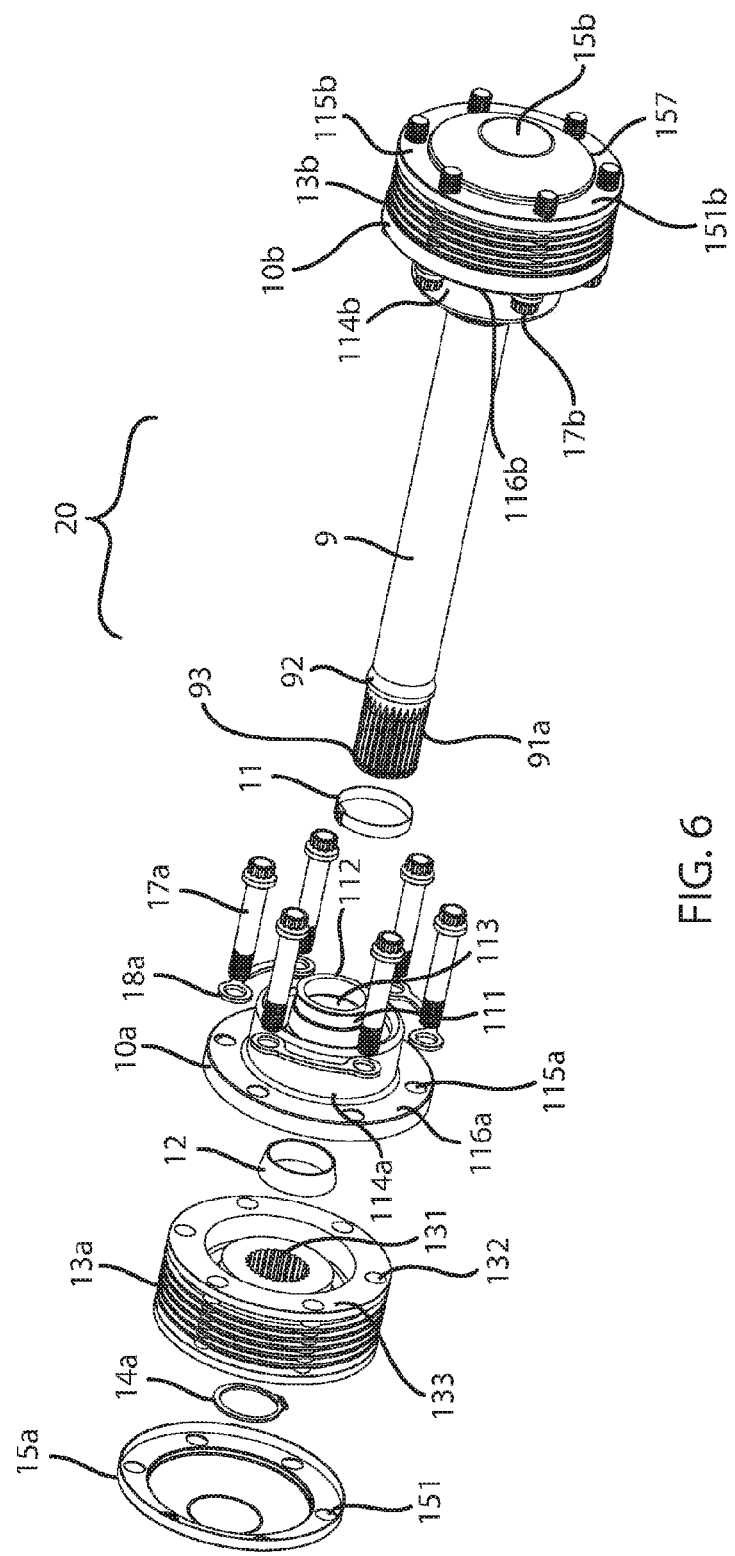
FIG. 6 illustrates a perspective exploded view of the dual constant velocity drive shaft assembly FIG. 1.

In accordance with various embodiments, as illustrated in FIG. 6, which is a partially exploded perspective view of a constant velocity shaft, a constant velocity shaft assembly 20 may include a drive shaft 9 attached on at least one end to a CV joint (e.g. first CV joint 13a). In various embodiments, a second CV joint (e.g. CV joint 13b) may be attached to the drive shaft 9 at the second end. The CV joints may be located at the transmission side of the drive shaft 9 or the differential side of the drive shaft 9 or CV joints may be located at both the transmission side and the differential sides of the drive shaft 9 as shown in FIG. 6. The drive shaft 9 may have splines 91a (and 91b not shown but located on the opposite end within second CV join 13b). The shaft 9 may also include a shoulder at the end of each spline 91a, 91b to act as a stop for the first CV joint 13a and second CV joint 13b respectively. The shaft 9 may also include an annular ridge 92 spaced apart from the splines of the shaft. The ridge 92 may mate with joint spacers 12, which may seat against the external face of first CV joint 13a proximal to the internal splines 131. The shaft 9 may also include snap ring grooves 93. Snap ring groove 93 may receive snap ring 14a (a similar structure and configuration may be present on the differential end of the drive shaft 9). The snap ring 14a may keep the shaft 9 from being fully withdrawn out of the internal splines 131 of the first CV joint 13a (likewise on CV joint 13b). The shaft 9 may be machined from metal alloys, steel, or other solid materials and or the shaft may be gun drilled.

In accordance with various embodiments, the splines 91a of shaft 9 may slide longitudinally within internal splines 131 of first CV joint 13a. Likewise the splines on the opposite end of shaft 9 may slide longitudinally within internal splines of CV joint 13b. Joint spacer 12 may apply a biasing force against ridge 92 and ring 14a may prevent shaft 9 from being fully withdrawn from first CV joint 13a (similarly the opposite end of shaft 9 may have similar features retaining that end). In this configuration, each end of shaft 9 associated with a CV joint may have a longitudinal travel which allows the CV driveshaft assembly to lengthen or shorten through the plunging style engagement between the shaft 9 and the CV joints 13a, 13b. This configuration allows the tail housing 1 to be a fixed style tail housing which does not include any longitudinal adjustment of the drive line or minimal longitudinal adjustment of the driveline. Thus, a plunging style CV driveshaft assembly may be used with a fixed or short transmission output. In some embodiments, just one side of the drive shaft 9 may be a plunger style engagement. In other embodiments, both sides of drive shaft 9 may be a plunger style engagement.

In accordance with various embodiments, as illustrated in FIG. 6, the CV joint assembly (forming a portion of the drive shaft assembly of FIGS. 2 and 2A-2B) may include sealing cap 15a, first CV joint 13a, and sealing boot housing 10a (likewise 15b, 13b, and 10b are similar in structure and function as shown in FIGS. 2, 2A, 2C, and 6). The sealing boot housing 10a, 10b may include a sealing boot 111 which may be a high RPM sealing boot. The sealing boots housing 10a may include a flange portion 116a, 116b and an internal sealing boot 111 being a deformable sealing element formed of a rubber or silicone. The flange portion 116a, 116b may include engagement features 115a, (e.g. apertures 115b not shown on 10b) configured to engage the first CV joint 13a. Bolts 17a, 17b may pass through apertures 115a, 115b and apertures 132 engaging in apertures 151 located in sealing cap 15a, 115b. The sealing boot 111 may have an internal aperture 113 sized to receive the drive shaft 9 through the aperture 113, which may be defined by an inner wall 112. A band clamp 11 may compress around the sealing boot 111 holding the sealing boot 111 in place on the shaft. The band clamp 11 may be formed of stainless steel. Utilizing a soft material such as rubber or silicone in the boot allows for both angular and axial articulations and movements of the drive shaft 9. Both the deformable sealing element 111 and an outer barrel 114a, 114b may allow for such articulation of the sealing boot 10a.

The constant velocity joints 13a, 13b may include internally at least 6 steel or ceramic balls that can transmit power/torque from inner ball tracks to outer ball tracks while allowing the splined aperture 131 to flex causing axial angle changes between the splined aperture 131 and the exterior ring 133 of the constant velocity joints 13a and 13b. The constant velocity joints 13a, 13b may also include a cage between the inner and outer races to maintain the alignment of the balls.

The CV joints 13a, 13b may be installed on the splines at both ends of the drive shaft 91a (and/or 91b not shown) and seated against the joint spacers 12 and retained with external rings 14a (and/or 14b not shown). A sealing cap 15a, 15b may be installed on each CV joint 13a, 13b after a grease is applied to the joints, and prevents the grease from loss and prevents any contaminants from entering into the CV joints 13a, 13b.

FIG. 7 illustrates a perspective view of the drive hub shown in FIGS. 2 and 2A-2B. The differential drive hub 16 is similar to transmission drive hub 3. The hub incorporates a mounting face 162 and bolt hole pattern 161 to match to the CV joint 13b, along with a shallow precision bore 165 to register the mating feature 157 (e.g. circular protrusion shown in FIG. 6) on seal cap 15b. The bolt pattern can be threaded or through holes where a nut would be required on each bolt to complete the connection. The larger diameter bore leading to the splines allows for the retaining nut to clear the joint assembly.

Figure 8:
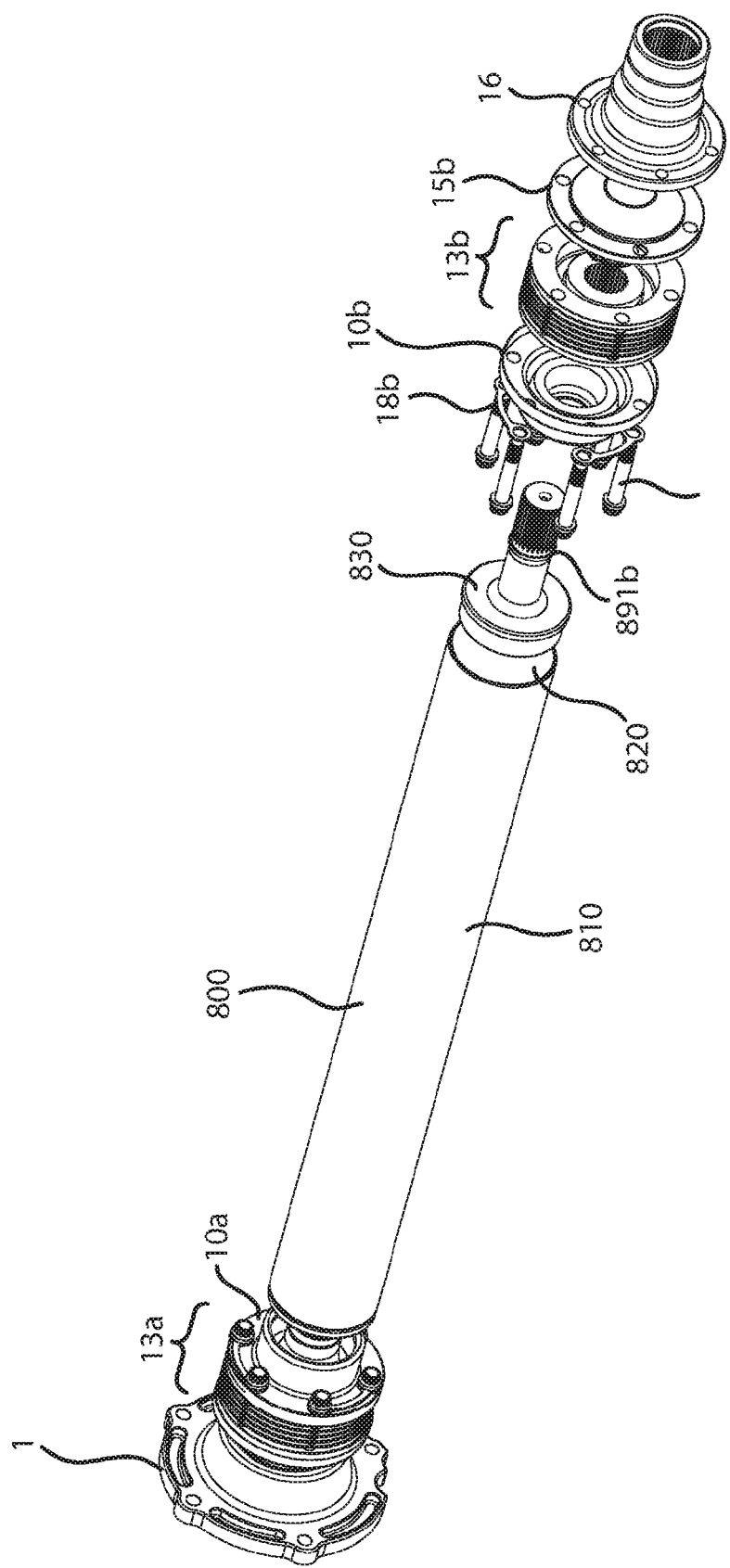
FIG. 8 illustrates a perspective view of a dual constant velocity drive shaft assembly in accordance with various embodiments.

In accordance with various embodiments, as illustrating in FIG. 8 the drive shaft may be an oversized drive shaft in longer applications. In such applications, a large diameter drive shaft 800 may extend between the first CV joint 13a and the second CV joint 13b. Weld yokes 820 may be inserted into tube 810. The weld yoke may neck down at transition 830 into the splined shaft 891b which engages the internal splines of CV joint 13b. A similar structure may be present on the transmission side of the drive shaft 800. The large diameter drive shaft 800 may limit whip caused at high shaft RPMs between the CV joints 13a, 13b.

Figure 9:
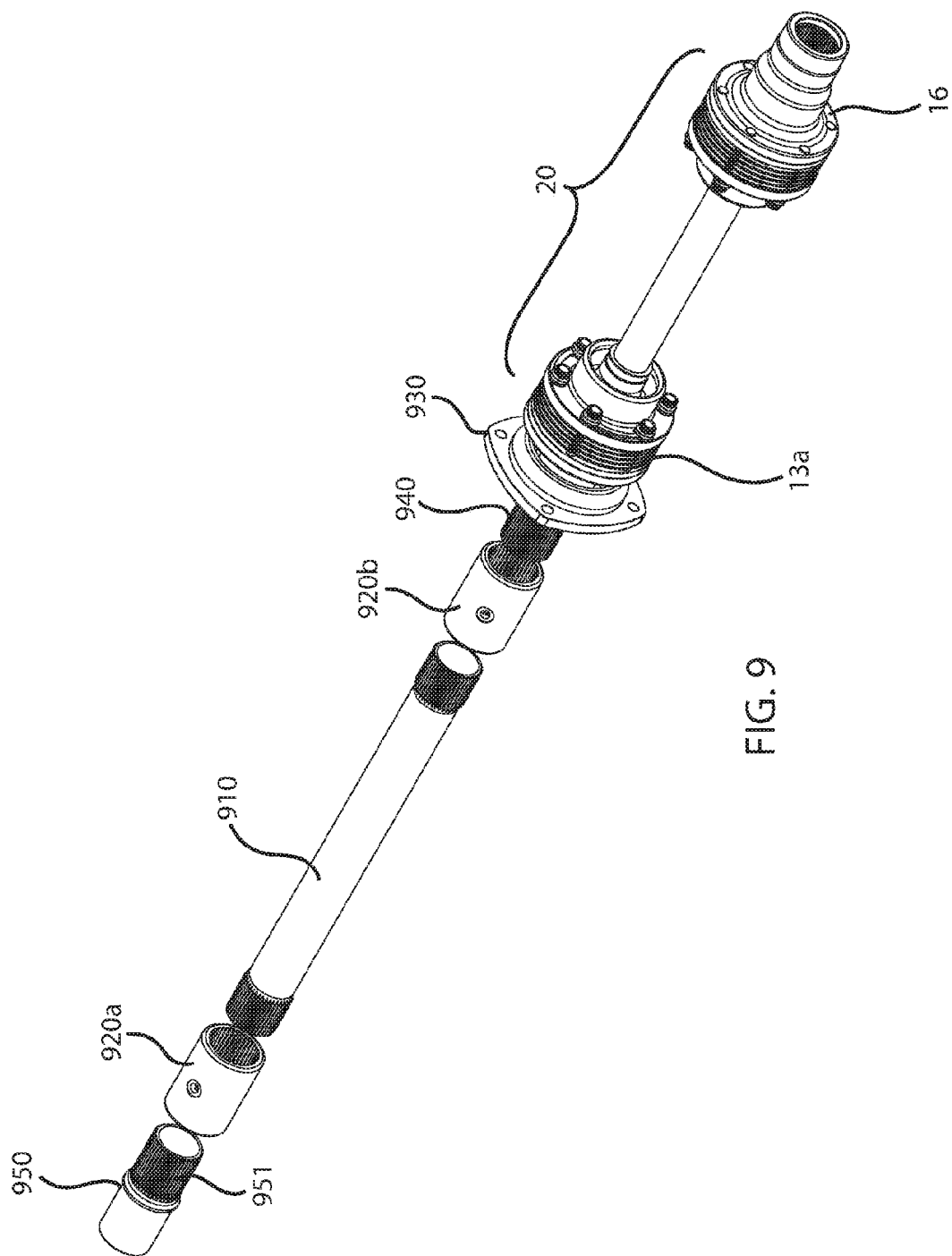
FIG. 9 illustrates a perspective view of a dual constant velocity drive shaft assembly with multiple shaft portions in accordance with various embodiments.

In accordance with various embodiments, as illustrating in FIG. 9, the CV drive shaft may include multiple shaft portions. For example, instead of the CV shaft assembly 20 mating with the transmission tail housing 1, the CV shaft assembly 20 may engage a carrier bearing 930 which supports a stub shaft 940. The carrier bearing may be mounted to the chassis of the automobile 60. The stub shaft 940 may engage a transmission, differential, steering system, or any other power transmission system. For example, the stub shaft 940 may couple to an extension shaft 910 through an internally splined coupler 920b. The extension shaft 910 may engage with a transmission, differential, steering system, or any other power transmission system. In the example shown in FIG. 9 the extension shaft 910 may couple with a transmission adapting coupler 950 through an internally splined coupler 920a. The transmission adapter coupler 950 may engage with a transmission, differential, steering system, or any other power transmission system. This setup allows the use of a short drive shaft 9 as a part of CV shaft assembly 20, while using a larger shaft diameter for shaft 910 over a larger length for long wheel base applications.

Assembly Methods

The transmission tail housing assembly and differential drive hub are installed first. Then, the constant velocity shaft assembly is put in place. The constant velocity joints 13 are bolted to the mounting flange or face of each drive hub 3, 16 with a series of bolts 17. The bolts 17 may pass through washers 18, the flange of the boot 10, and the constant velocity joint outer race 13 and then are threaded into each drive hub 3, 16 by the bolts 17. The washers 18 may be two hole washers. The bolts may be torqued to a recommended standard for the bolt sizes. When through-holes are used in the drive hubs, longer retaining bolts may be used to allow the bolts to pass through the mounting flange of the drive hub 3, 16. A nut may be installed on each bolt, and is again torqued to the recommended standard.

The drive hubs 3, 16 may be machined from steel or aluminum or other metals. The engagement features may be threaded holes, through-holes, and or any other feature known in the art.

In some embodiments, the shaft may be solid. In other embodiments, when an overall length of the shaft exceeds its speed limitation of the solid shaft, the shaft may be replaced by a tubular shaft, of a diameter and a wall thickness that may meet the RPM and length requirements.

In alternative embodiments, the system could be made up of two sections where the rear section would remain as described with exception that the described transmission tail housing would instead be mounted to the vehicles chassis rather than the transmission but directly in line the vehicles transmission output shaft, allowing for a separate solid or gun drilled shaft to make the connection to the transmission via splined couplings, keeping the critical speed in line for both sections.

The various embodiments as discussed herein may be applied to systems other than transmission differential power transmissions. For example, they may be utilized with transfer case torque transmission, steering torque transmission, or applications outside of the automobile industry that require torque transmission.

Those skilled in the art will appreciate that the presently disclosed embodiments teach by way of example and not by limitation. Therefore, the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween. Although various representative embodiments of this invention have been described above with a certain degree of particularity, those skilled in the art could make numerous alterations to the disclosed embodiments without departing from the spirit or scope of the inventive subject matter set forth in the specification and claims. All directional references (e.g., upper, lower, upward, downward, left, right, leftward, rightward, top, bottom, above, below, vertical, horizontal, clockwise, and counterclockwise) are only used for identification purposes to aid the reader's understanding of the embodiments of the present invention, and do not create limitations, particularly as to the position, orientation, or use of the invention unless specifically set forth in the claims. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other.

In some instances, components are described with reference to "ends" having a particular characteristic and/or being connected with another part. However, those skilled in the art will recognize that the present invention is not limited to components which terminate immediately beyond their points of connection with other parts. Thus, the term "end" should be interpreted broadly, in a manner that includes areas adjacent, rearward, forward of, or otherwise near the terminus of a particular element, link, component, part, member or the like. In methodologies directly or indirectly set forth herein, various steps and operations are described in one possible order of operation, but those skilled in the art will recognize that steps and operations may be rearranged, replaced, or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

The invention claimed is:

1. A constant velocity driveline assembly for power transmission of an automobile, the assembly comprising:
a tail housing assembly comprising a housing, at least two bearings inside the housing, and a first drive hub supported by the at least two bearings, the first drive hub being substantially fixed longitudinally and configured to connect to an engine or transmission of the automobile;

a second drive hub configured to connect to a rear differential of the automobile, each drive hub comprising a barrel portion and a mounting flange connected to an end of the barrel portion, wherein the mounting flange of each drive hub comprises a plurality of holes spaced along the outer circumference of the flange;

a first constant velocity driveshaft joint configured to attach to the mounting flange of the first drive hub; and a drive shaft having a first splined axial end coupled to internal splines on the first constant velocity driveshaft joint;

a second constant velocity driveshaft joint comprising internal splines to couple to a second splined axial end of the drive shaft to transmit torque, the second drive hub coupled to an external housing of the second constant velocity driveshaft joint;

an external fastening ring configured to retain the first constant velocity driveshaft joint to the drive shaft; and a sealing plug and an O-ring that seals the barrel portion of the first drive hub, and an internal snap ring to snap fit inside the first drive hub to retain the plug.

2. The assembly of claim 1, wherein the mounting flange of at least one drive hub comprises a plurality of threaded holes or through-holes configured to attach to the first constant velocity driveshaft joint by a plurality of fasteners.

3. The assembly of claim 1, further comprising a boot housing having a sealing boot, with the boot housing comprising a flange portion configured to fasten to the first constant velocity driveshaft joint and, the boot housing receiving the splined axial end of the shaft.

4. The assembly of claim 3, wherein the flexible boot comprises a deformable sealing element configured to allow both angular and axial movements of the shaft.

5. The assembly of claim 4, wherein the deformable sealing element comprises rubber or silicone.

6. The assembly of claim 1, further comprising a joint spacer seated on a ridge located on the shaft.

7. The assembly of claim 1, further comprising a cap placed at opposite ends of the constant velocity driveline on each of the first and second constant velocity driveshaft joints for sealing grease inside each of the first and second constant velocity driveshaft joints.

8. A constant velocity driveline assembly for power transmission of an automobile, the assembly comprising:
a tail housing assembly comprising a housing, at least two bearings inside the housing, and a first drive hub supported by the at least two bearings, the first drive hub being substantially fixed longitudinally and configured to connect to an engine or transmission of the automobile;
a second drive hub configured to connect to a rear differential of the automobile, each drive hub comprising a barrel portion and a mounting flange connected to an end of the barrel portion, wherein a sealing plug and an O-ring seals the barrel portion of the first drive hub, and an internal snap ring snap-fits inside the first drive hub to retain the plug;
a first constant velocity driveshaft joint configured to attach to the mounting flange of the first drive hub, the first constant velocity driveshaft joint having internal splines; and
a drive shaft having a first splined axial end coupled to the internal splines of the first constant velocity driveshaft joint;
a second constant velocity driveshaft joint comprising internal splines to couple to a second splined axial end of the drive shaft to transmit torque, the second drive hub coupled to an external housing of the second constant velocity driveshaft joint;
a boot housing and a sealing boot with the boot housing comprising a flange portion configured to fasten to the first constant velocity driveshaft joint, the boot housing ad receiving the splined axial end of the shaft; wherein the sealing boot includes a deformable sealing element configured to allow both angular and axial movements of the shaft and a band clamp that holds the deformable sealing element to the shaft.

9. The assembly of claim 8, wherein the mounting flange of at least one drive hub comprises a plurality of threaded holes or through-holes configured to attach to the first constant velocity driveshaft joint by a plurality of fasteners.

10. The assembly of claim 8, further comprising a joint spacer seated on shoulders located on the shaft.

11. The assembly of claim 8, further comprising an external fastening ring configured to retain each of the first and second constant velocity driveshaft joints to the shaft.

12. A constant velocity driveline assembly for power transmission of an automobile, the assembly comprising:
a tail housing assembly comprising a housing, at least two bearings inside the housing, and a first drive hub supported by the at least two bearings, the first drive hub being substantially fixed longitudinally and configured to connect to an engine or transmission of the automobile;
a second drive hub configured to connect to a rear differential of the automobile, each drive hub comprising a barrel portion and a mounting flange connected to an end of the barrel portion;
a first constant velocity driveshaft joint configured to attach to the mounting flange of the first drive hub, the first constant velocity driveshaft joint having internal splines;
a drive shaft having a first splined axial end coupled to the internal splines of the first constant velocity driveshaft joint;
a second constant velocity driveshaft joint comprising internal splines to couple to a second splined axial end of the drive shaft to transmit torque, the second drive hub coupled to an external housing of the second constant velocity driveshaft joint;
a cap placed at opposite ends of the constant velocity driveline on each of the first and second constant velocity driveshaft joints for sealing grease inside each of the first and second constant velocity driveshaft joints;
an external fastening ring configured to retain each of the first and second constant velocity driveshaft joints to the drive shaft; and
a sealing plug and an O-ring that seals the barrel portion of the drive hub, and an internal snap ring to snap fit inside the drive hub to retain the plug.

13. The assembly of claim 12, wherein the mounting flange of at least one drive hub comprises a plurality of threaded holes or through-holes configured to attach to the first constant velocity driveshaft joint by a plurality of fasteners.

14. The assembly of claim 12, further comprising a joint spacer seated on shoulders located on the shaft.

* * * * *